Sept. 20, 1938.　　　　J. SANDIN　　　　2,130,904
CIRCUIT INTERRUPTER
Filed Sept. 27, 1935　　　3 Sheets-Sheet 1
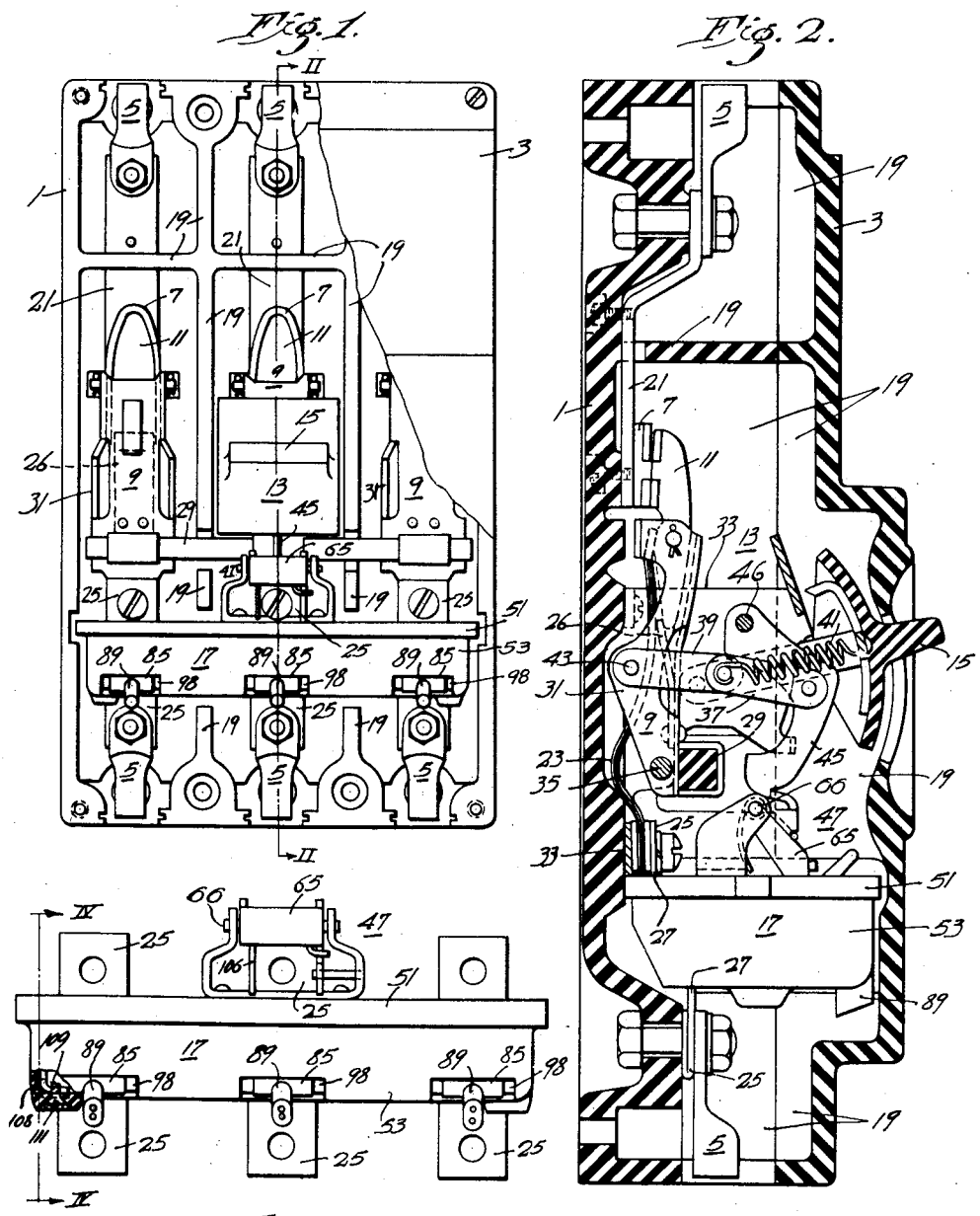
WITNESSES:
INVENTOR
Jerome Sandin.
BY
ATTORNEY Sept. 20, 1938.  J. SANDIN  2,130,904
CIRCUIT INTERRUPTER
Filed Sept. 27, 1935    3 Sheets-Sheet 2

WITNESSES:

INVENTOR
Jerome Sandin.
BY
ATTORNEY

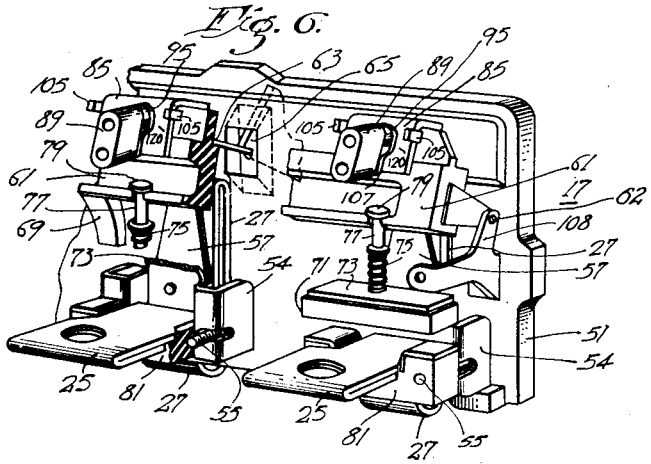
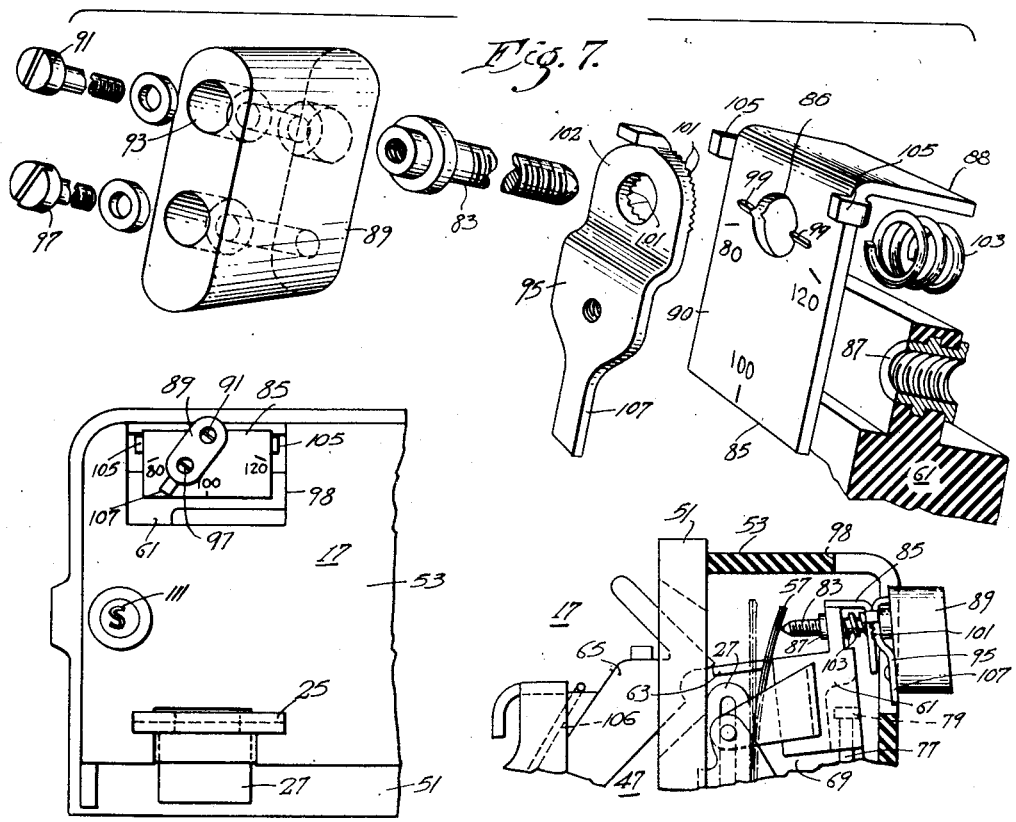

Patented Sept. 20, 1938

2,130,904

UNITED STATES PATENT OFFICE 2,130,904

CIRCUIT INTERRUPTER

Jerome Sandin, Forest Hills, Pa., assignor to Westinghouse Electric & Manufacturing Company, East Pittsburgh, Pa., a corporation of Pennsylvania Application September 27, 1935, Serial No. 42,395

25 Claims. (Cl. 200—116)

My invention relates generally to electrical apparatus and more particularly to electro-responsive trip devices for use in conjunction with circuit breakers of the type used for controlling distribution network and industrial feeder circuits.

The provision of a satisfactory circuit interrupter for this type of service has always presented a most troublesome problem to the art, due to the exacting and somewhat conflicting requirements which a commercially successful device must meet. Because of the large amounts of power which may be fed into a short circuit or other fault conditions on circuits of this type, it is necessary that the protective breakers therefor shall be capable of reliably interrupting extremely large amounts of power, despite the fact that the normal current flow through the circuit and hence the normal current rating of the breaker does not exceed more than a moderate value. Further, in order to preserve system stability, it is necessary that the interrupter shall be capable of interrupting these large amounts of power within an extremely short interval of time.

Breakers of the type to which the present invention particularly appertains are usually operated by more or less inexperienced persons, and they are often mounted in exposed locations indoors. As a result, it is imperative that they shall be absolutely safe and reliable in operation.

To assure adequate protection of the associated equipment, it is necessary that the breakers shall be capable of automatic operation in response to the actuation of a trip device or like means responsive to overloads or other abnormal circuit conditions. Further, it is desirable that the electro-responsive trip means for effecting automatic operation of the breaker shall be capable of accurately distinguishing between transient overloads and those of a prolonged character, because if the interrupter shall operate immediately upon the occurrence of all overload conditions, it is inevitable that there will be numerous unnecessary and undesirable discontinuities in the service.

In contrast with these operational requirements, it is essential that the initial cost of the breakers shall not be unreasonably large, due to the large number which are used on even a small system or network. Likewise, if the device is to be commercially successful, it is necessary that the servicing and maintenance costs shall not be unduly large.

The principal object of the present invention, therefore, is to provide an improved circuit breaker and trip device which shall be capable of meeting all of the above stated requirements.

One form of circuit breaker which has been used rather extensively in the past, comprises a standardized contact structure and actuating mechanism, a suitable closure, terminals for connecting the breaker into an electric circuit, and a removable, electro-responsive trip device operable upon the occurrence of predetermined conditions to cause the actuating mechanism to move the contacts automatically to the open circuit position. By making the trip device readily removable and hence interchangeable with similarly proportioned devices of like or different rating, it is possible to market an entire line of circuit breakers built up around a single, standardized contact structure, actuating mechanism, and breaker closure. This arrangement obviously makes possible substantial reductions in the initial cost of the apparatus, and by greatly reducing the number of parts which must be stocked by both the manufacturer and the user, it also decreases the operating and maintenance costs.

Since the trip devices are removable as a unit from operative engagement from the other elements of the breaker structure, it is necessary that some means be provided for preventing unauthorized persons from tampering with the mechanism of the trip device or altering the calibration thereof. The usual means for accomplishing this consists in the provision of a separate sealed closure for the trip device, this closure forming an integral part of that device.

While the use of a sealed closure for the trip device constitutes a satisfactory means for preventing tampering with the mechanism of the trip device, it has the objection that it does not permit any change to be made in the tripping point of the trip structure during the operation thereof. The provision of means whereby the tripping point of a trip device which is provided with a separate, sealed closure may be varied constitutes another, and possibly the most important, object of the present invention.

A further object of the present invention is to provide a simple means for adjusting the tripping point of the electro-responsive tripping elements of a trip device of the above described type, which means may be calibrated during the manufacture of the device and which is so arranged that it will not ordinarily get out of adjustment or otherwise lose its calibration during its operative life.

A still further object of the invention is to provide a simple means for varying the tripping point of a removable, unitary trip device, which means shall include latching means for positively retaining the adjusting means in any position to which it may be moved.

An ancillary object of the invention is to provide a simple and reliable means for altering the tripping point of electro-responsive trip devices of the type under consideration, which means may be readily embodied into existing structures without substantial modification thereof.

These and other objects of the invention will be made more apparent in the drawings and the following description of one preferred embodiment thereof. Referring particularly to the drawings, Figure 1 is a plan view of a circuit breaker which is provided with a removable trip device constructed in accordance with the present invention. The cover portion of the breaker closure has been cut away in order to more clearly illustrate the structural features of the breaker.

Fig. 2 is an enlarged sectional view on the line II—II of Fig. 1. One side of the frame of the operating mechanism has been cut away in order to more clearly illustrate the structural elements of that mechanism.

Fig. 3 is a plan view of the removable trip device forming a part of the breaker illustrated in Figs. 1 and 2.

Fig. 6 is a fragmentary perspective view showing the features of the trip device illustrated in the other figures of the drawings and the adjusting means used in conjunction therewith.

Fig. 7 is an exploded perspective view of the adjusting means utilized for altering the tripping point of the thermally responsive tripping elements forming a part of the trip device shown in detail in the other figures of the drawings.

Fig. 8 is a fragmentary front elevational view of the trip device illustrated particularly in Figs. 3 through 6, and Fig. 9 is a fragmentary view similar to Fig. 4 showing the structural features of the trip device in a position intermediate the normal inoperative and the operative position.

Figure 4:
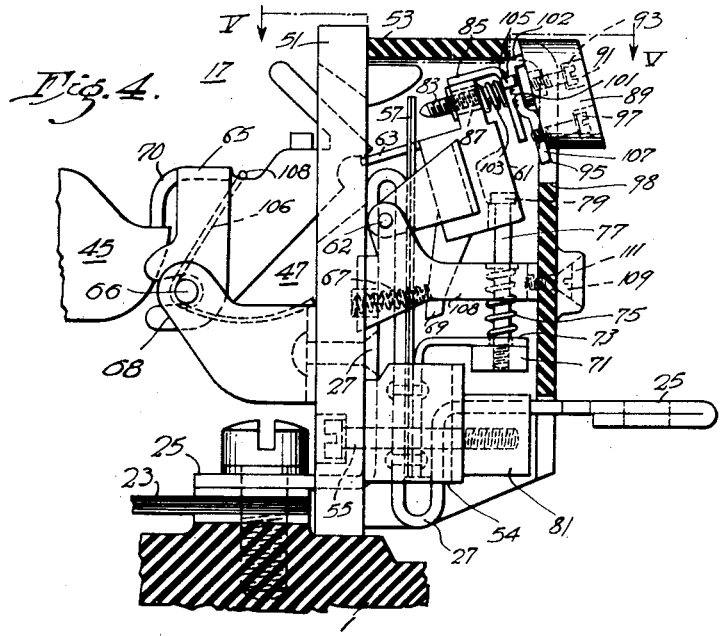
Fig. 4 is an enlarged sectional view of the trip device shown particularly in Fig. 3. The view is taken on the line IV—IV of that figure.
Figure 5:
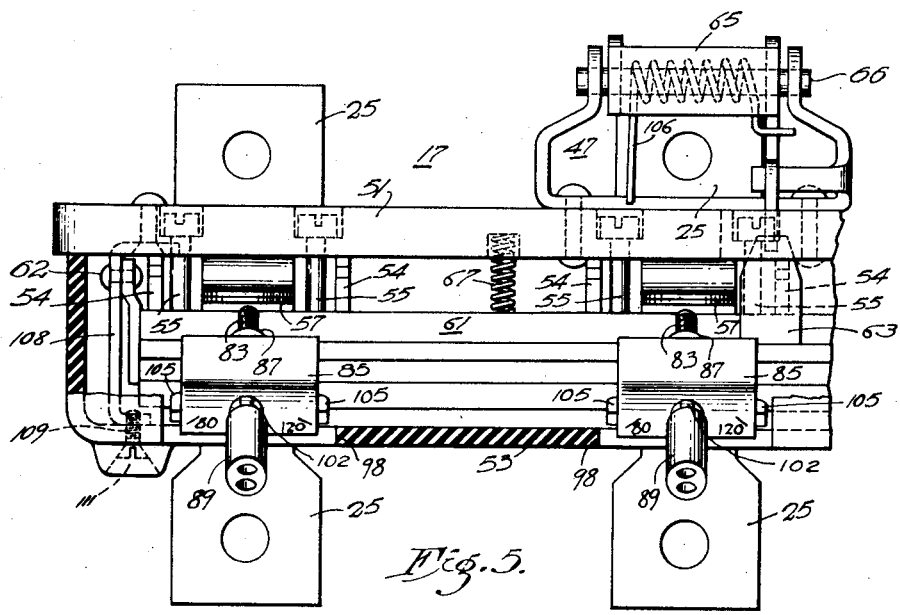
Fig. 5 is a fragmentary plan view of the trip device illustrated in Figs. 3 and 4. The view is taken on the line V—V of Fig. 4.

The circuit breaker shown in Figs. 1 and 2 is of the three-pole type and comprises, generally, a cooperating base 1 and cover 3 which define the breaker closure; six terminals 5, two for each of the three poles, for connecting the breaker into an electrical circuit or circuits; three stationary contacts 7; three movable switch arms 9, each of which includes a movable contact 11 for cooperating with one of the stationary contacts 7; an actuating mechanism 13 operable in response to the movement of a suitable operating handle 15 to move the switch arms 9 and the movable contacts 11 into and out of engagement with the stationary contacts 7; and an electro-responsive trip device 17 operable upon the occurrence of predetermined conditions to cause the actuating mechanism 13 to move the switch arms 9 and the movable contacts 11 associated therewith automatically from the closed circuit position to the open circuit position. The base 1 and the cover 3 are preferably formed of molded insulating material and are provided with suitable cooperating ribs and partitions 19 molded integral therewith for dividing the breaker closure into three separate chambers, one for each of the poles of the breaker.

As will be discussed in detail in subsequent paragraphs, the trip device 17 is removable as a unit from operative engagement with the other elements of the breaker. It is provided with a sealed closure, a plurality of electro-responsive tripping elements, each individually actuable to effect the operation of the trip device, disposed within the closure, and means for varying the tripping point of at least some of the tripping elements without necessitating the opening of the sealed closure.

One of the terminals 5 is mounted at either end of each of the three pole chambers defined by the partitions 19 by means of suitable screw fastenings. The stationary contact 7 for each of the poles of the breaker is supported upon a flat strip 21 of conducting material which is rigidly affixed to the base 1 of the interrupter, adjacent the upper end of each of the pole chambers, by suitable screws or like means; each of the strips 21 also serves to electrically connect the stationary contact supported thereon with the cooperating upper terminal 5 of the breaker. Each of the movable contacts 11 has a flexible shunt 23 brazed or otherwise rigidly affixed to the central portion thereof, and one of these shunts 23 serves to connect each of the movable contact members 11 with one of the terminals 25 of the removable trip device 17. The corresponding opposite terminal 25 of the removable trip device 17 is directly connected to one of the lower terminals 5 of the breaker, and a looped conducting strip 27 which serves as the energizing means for the tripping elements associated with each pole of the trip device serves to complete the electrical circuit for each of the poles of the breaker between each of the cooperating pairs of terminals 25 of the trip device. Each of the movable contacts 11 is resiliently biased toward the cooperating stationary contact 7 by a flat leaf spring 26.

The three switch members 9 are mechanically interconnected by means of a square tie member 29 of insulating material, which member is rigidly affixed to the rear portion of the frame 31 of each of the switch arms 9. The assemblage formed by the three interconnected switch arms 9 is pivotally supported upon the frame 33 of the actuating mechanism 13 by means of a suitable pivot pin 35.

The actuating mechanism 13 for the breaker is not an important part of the present invention and any means whereby the interconnected switch arms 9 and the movable contacts 11 associated therewith may be moved to the open and to the closed circuit position in response to movement of an operating handle, and whereby automatic opening of the breaker is effected in response to the operation of the breaker trip device may be employed. I prefer to use a mechanism of the type disclosed in the copending application of Harry J. Lingal, Serial No. 600,624, which was filed on March 23, 1932, now Patent #2,047,739, issued July 14, 1936, and which is assigned to the assignee of the present invention.

A mechanism of this type, as is shown particularly in Fig. 2, comprises the operating handle 15, a pair of interconnected link members 37 and 39 which form a toggle linkage, and an overcenter spring 41 for operatively connecting the toggle linkage with the operating member 15. One end of the toggle linkage is mechanically connected to the frame 31 of the central switch member by a pivot pin 43, and the other end of the toggle linkage is supported upon a cradle member 45 which member is, in turn, supported on the frame 33 of the actuating mechanism by a pivot pin 46. The cradle member 45 is normally restrained in the position shown in Fig. 2 by the latch means 47 forming a part of the trip device 17. Upon the operation of the trip device this latch means 47 releases the unsupported lower end of the cradle 45, and that member moves under the biasing action of the reaction force of the overcenter spring 41 in a counterclockwise direction about the supporting pivot pin 46 therefor to a position where the center line of the overcenter spring 41 lies beneath (Fig. 2) the center line of the link 37. In this position, the toggle linkage is unstable, and it is moved to the collapsed position by the overcenter spring 41, thereby effecting the movement of the interconnected switch arms 9 to the open circuit position. The mechanism is so arranged that the cradle member 45 may be restored to the latched position by moving the operating handle 15 from the position shown in Fig. 2 to the normal open circuit position.

The trip device 17, as mentioned in the foregoing, comprises a unitary structure having a base 51 and a cover 53 for cooperating therewith to define a closure for the device, the six terminals 25 for electrically connecting the trip device into the circuit controlled by each of the poles of the breaker, the latch means 47 which cooperates with the contact actuating mechanism 13, a plurality of electro-responsive tripping elements each operable upon the occurrence of predetermined conditions to effect the operation of the trip device, thereby causing the latch means 47 to release the cradle member 45, and means for adjusting the tripping point of at least some of the electro-responsive elements. The base 51 and cover 53 are preferably formed of molded insulating material and the terminals 25 are rigidly affixed to the base 51 in order that they may serve to support the trip device within the breaker closure when that device is in an operative position therein.

The trip device 17 includes three thermally responsive and three magnetically responsive tripping elements, and these tripping elements are arranged in pairs, consisting of one element of each type. The two component elements of each of these pairs are supported upon a common frame 54 which is affixed to the base 51 of the trip device by two screws 55, and are energized in response to the current flow in one of the poles of the breaker. Each of the thermally responsive tripping elements comprises a bimetallic strip 57 which is riveted at one end thereof to one of the looped conductors 27 and to the central portion of one of the common support frames 54 which serve to support each pair of the tripping elements. The conductors 27 are provided with suitable portions of increased resistance in order that they shall serve as energizing heaters for the thermally responsive elements. A single trip bar 61, which is formed of molded insulating material and which is pivotally supported at the ends thereof as shown at 62, extends across the entire trip device and hence across all of the poles of the breaker. This bar is adapted to be engaged and moved from the normal inoperative position, as shown in Figs. 4 and 6, to a position where it effects the operation of said trip device by any one of the tripping elements. The trip bar 61 is provided with a latch retaining member 63 rigidly supported thereon for engaging the pivoted trip latch 65, and is biased into engagement with this latch by a suitable spring 67 interposed between the base 51 of the trip device and a projection 69 molded integral with the trip bar. The trip latch 65 is pivoted as shown at 66.

Each of the magnetically responsive elements comprises an armature 71 supported for slidable movement upon a suitable bracket 73 formed integral with the supporting frame 54 for each pair of the tripping elements. Each of the armatures 71 is biased to the position shown in Figs. 4 and 6 by means of a suitable spring 75, and the support and guide pin 77 for each of the armatures is provided with an enlarged head portion 79 for directly engaging suitable cooperating openings formed in the trip bar 61. A U-shaped core 81 is supported upon each of the frames 54 for attracting the armature 71 of each of the magnetically responsive elements, and the looped conductor 27 for each of the poles of the trip device extends through this core in order that the energization thereof shall be responsive to the magnitude of the current flowing through each of the poles of the breaker.

As mentioned above, each of the looped conducting strips 27 has a portion of reduced cross section disposed adjacent the portion thereof which extends along the associated bimetallic member 57, and the constants of the several structural features are so arranged that the heating produced by the flow of predetermined abnormal currents through any one of these conducting strips for a predetermined period of time results in sufficient heating of the associated bimetallic member 57 to cause that member to move from the normal position shown in Fig. 4 to a position where the latch engaging member 63 disengages the trip latch 65 thereby effecting the operation of the trip device, and the opening of the breaker. The position of the elements of the trip device shortly before the latch engaging member 63 has disengaged the trip latch 65 are illustrated in Fig. 9.

Upon the occurrence of predetermined large overloads in the circuit controlled by any one of the poles of the breaker, the core member 81 for the corresponding pole of the trip device is energized sufficiently to attract the associated armature 71 thereby moving the trip bar 61 to the tripped position. Thus, the trip device is operable after a predetermined time interval following the occurrence of predetermined low magnitude overloads to cause the actuating mechanism 13 to effect the opening of the breaker, and it is operable substantially instantaneously upon the occurrence of predetermined large magnitude overloads to effect the opening of the breaker.

The above stated mode of operation provides satisfactory protection for a large number of present day installations. However, in certain instances, it is desirable to vary the tripping point of the thermally responsive elements either to take care of certain temporary abnormal conditions or to provide a more flexible arrangement. The provision of means for accomplishing this, without necessitating the opening of the trip closure, constitutes, as mentioned previously, one of the most important objects of the present invention.

As shown particularly in Figs. 4 through 7, each of the bimetallic, thermally responsive elements 57 engages the trip bar 61 through an adjustable engaging means. Generally, this means comprises an adjustable screw 83 disposed intermediate the trip bar 61 and the bimetallic element 57, means for holding the screw in predetermined positions, a suitable calibration scale, and an operating member 89.

More particularly, each of the adjusting means is mounted upon a frame member 85 which slidably engages the upper portion of the trip bar 61. The adjustable screw 83 for directly engaging the bimetallic elements is adapted to extend through a suitable threaded sleeve 87 molded integral with the trip bar itself, and is preferably a multi-thread screw in order to maximize the longitudinal movement thereof in response to movement of the operating member 89 for the adjusting means. The operating member 89 is formed of insulating material and is rigidly connected to the adjustable screw 83 by means of a locking screw 91 which extends through an opening 93 formed therein. In order that the adjusting means shall retain any particular setting, a notching member 95 is positioned intermediate the supporting frame 85 and the operating member 89, this member being mechanically connected to the operating member 89 by means of a suitable screw 97. Each of the operating members 89 extends through an opening 98 formed in the cover 53 of the trip device, in order that the tripping point of the bimetallic tripping elements may be varied without necessitating the opening of the closure for the trip device.

Each of the frames 85 is provided with a pair of tooth-like projections 99 formed integral therewith for engaging similarly proportioned, radially extending teeth 101 formed in the upper portion 102 of the intermediate member 95 which is supported thereon, and a suitable spring 103, which is positioned between the central portion of the supporting frame 85 and the trip bar 61, serves to bias the cooperating toothed portions 99 and 101 of the intermediate member and the frame into resilient engagement with each other. The frames 85 are provided with openings 86 through which the adjusting screws 83 pass, the openings 86 being of slightly greater diameter than the diameter of the screws 83 as shown in Fig. 7. The top flanges 88 of the members 85 rest on the top surface of the trip bar 61. The frames 85 are free to slide in an axial direction on the adjusting screws 83 and are held against rotational movement thereon by reason of the springs 103 which obviously hold the lower flat surface of the flanges 88 in frictional engagement with the top surface of the trip bar 61. The frames 85 are biased by the springs 103 so that the depending flanges 90 which carry the teeth 99 are biased into resilient engagement with the surface of the intermediate members 95 which carry the teeth 101. The members 95 are held in rigid engagement with their operating members 89 by the screws 97 to turn with the same, and the operating members are thus resiliently retained in any set position by the resilient engagement of the teeth 99 with the teeth 101. A suitable calibration scale is engraved on the exposed face of each of the frames 85. In the structure illustrated in the drawings a scale having three calibration points, representing 80, 100, and 120 per cent of the normal rating of the bitmetallic tripping elements, has been provided for each adjusting means.

When these devices are being manufactured on a production basis, the calibration scales for any particular range of current values are uniform. It is necessary, therefore, that the adjusting screw 83 for each of the adjusting means shall be accurately positioned with respect to the co-operating notching member 95 during the assembling operation. This positioning is preferably accomplished by setting the notching member 95 to some point on the calibration scale, then adjusting the screw 83 to a position where the operation of the trip device will be in response to a current value corresponding to the selected point on the calibration scale, and finally soldering or otherwise locking the screw and notching member in the determined position. After this has been done, the operating member 89 may be affixed to the interconnected screw and notching member without danger that the calibration shall be disturbed.

A pair of projecting lugs 105 are formed integral with the supporting frame 85 for each of the adjusting means and are adapted to engage the downwardly projecting portion 107 of intermediate notching member 95 in order to provide stops for preventing the operating member 89 from being turned more than about 180° during the adjusting operation. This means assures that the accuracy of the calibration scales shall not be impaired due to the turning of the operating member 89 completely around.

It is believed that the operation of the breaker actuating mechanism 13 and the trip device 17 is obvious from the foregoing. The actuating mechanism 13 is operable to move the assemblage formed by the interconnected switch arms 9 from the closed circuit position shown in Fig. 2 to the open circuit position in response to movement of the operating handle 15. Any one of the bimetallic thermally responsive tripping elements 57 or the magnetically responsive tripping elements is actuable upon the occurrence of predetermined conditions to effect the operation of the trip device 17, i. e., to move the trip bar 61 from the normal inoperative position shown in Fig. 4 to an operative position, in which latter position the latch retaining member 63 is moved out of engagement with the pivoted trip latch 65. When this occurs, the latch 65 is free to rotate in a clockwise direction. The latch 65 is partially rotated in a clockwise direction against the action of its return spring 106 by the movement of the cradle member 45 effected by the tension of the switch actuating overcenter spring 41, whose tension is greater than that of the return spring 106. The movement of the cradle member 45 continues after its nose has passed beyond the depending end of the latch 65. At this point the spring 106 which biases the latch in a counterclockwise direction returns the latch 65 to its latching position where it is again in position to automatically reengage the nose of the cradle member when said cradle member is returned to latched position upon the manual movement of the handle 15 to open position. Following its release, the cradle member 45 moves automatically under the reaction forces of the overcenter spring 41 to a position where it effects automatic operation of the actuating mechanism 13 and the opening of the breaker. The overcenter spring construction of the breaker actuating mechanism causes the assemblage formed by the interconnected switch arms 9, and hence the movable contacts 11, to be moved from one position to the other with a snap action.

The latch 65 is biased to the normal latched position shown in Fig. 4 by the return spring 106, and the trip bar 61 is also biased to the normal inoperative position shown in Fig. 4 by the spring 67. The latch 65 is provided with a bifurcated end 68 which pivotally engages the pivot pin 66.

The return spring 106 has a bent end 108 which engages a notch provided in an edge of the latch 65 at a point above and to the right of the pivot pin 66 as best shown in Fig. 4. The body of the spring 106 is then coiled around the pivot pin 66 and its other end engages under tension the top of the base of the yoke which supports the pin 66 as clearly shown in Figs. 4 and 5. The latch 65 is thus rotatably mounted on the pin 66 and is also free to slide thereon by reason of the bifurcated end 68. After the latch 65 has been released and the cradle member 45 moves to open the contacts, the spring 106 returns the latch to latching position as explained above. When the cradle member 45 is now rotated in a clockwise direction, by operation of the switch handle 15 to the open position, the cam surface of the nose of the cradle causes the latch 65 to partially slide back on the pivot pin 66 and thus allows the nose to move past the latch engaging portion 70. The cradle is now again in latched position. Thus the trip device is automatically re-settable following each operation thereof.

To reset the operating mechanism 13 following each automatic operation thereof, the operating handle 15 is moved from the intermediate tripped position to the normal open circuit position. This movement is transmitted directly to the cradle member 45 and that member is returned to the position shown in Figs. 2 and 4. In order to permit the trip latch 65 to reengage the cooperating end of the cradle member 45 during the resetting operation of the mechanism 13, the latch 65 is slidably as well as pivotally mounted upon the support means therefor as has been previously explained.

It will be seen that the above described means constitutes a simple, accurate, and convenient arrangement for varying the tripping point of the bimetallic tripping elements 57 from without the sealed closure for the trip device. While a variation between 80 and 120 per cent of the normal rating of the tripping elements is ordinarily sufficient and such a calibration scale of this range has been illustrated in the drawings, scales of other ranges may be readily provided. The downwardly projecting portion 107 of the intermediate notching member which engages the stops 105 comprises a convenient indicator for cooperating with the calibration scale.

In the assembled trip device the notching means forming part of each of the tripping point adjusting means retains the operating member 89 in any position to which it may have been moved and thus renders the device reliable in operation. The lugs or stops 105 which prevent the operating members 89 for the adjusting means from being moved beyond the normal operative range of the device add a further factor of safety.

Ordinarily, the trip device will be calibrated during its manufacture. The cover 53 will then be placed in cooperative engagement with the base 51 and will be affixed to the brackets 108, which also serve to support the trip bar 61 by means of suitable screws 109. Then, to prevent tampering with the device, a seal 111 will be placed over each of the screws, as is shown particularly in Figs. 3 and 8. The resultant trip device comprises a unitary structure, all of the operative elements of which are enclosed within a sealed closure. At the same time, the tripping point of any one of the thermally-responsive tripping elements 57 of the trip device may, without necessitating the opening of the sealed closure for the trip device proper, be varied within certain definite limits by the movement of a suitable operating member. The objects of the invention are thus accomplished without any sacrifice of the normal reliability of operation of trip devices of the type to which the invention particularly appertains, or without necessitating the provision of a device which is not sealed during its manufacture.

Further, the adjusting means of my invention is readily applicable to existing structures, both of the type which utilize separate sealed closures for the trip device and of the type which do not utilize such closures, without necessitating any change in their structural arrangement or physical dimensions. The entire adjusting means is supported upon the trip bar; while simple in structure, it is of substantially foolproof construction; and it is provided with a simple notching device for assuring that it shall retain its adjustment during the operation thereof.

If desired, suitable openings may be provided in the cover 3 for permitting the operating member 89 of each of the adjusting means to be reached and actuated from without the closure for the breaker proper.

While, in accordance with the patent statutes, I have disclosed the specific details of one embodiment of my invention, it is to be understood these details are merely illustrative and that variations in their precise form will be not only desirable but necessary in certain instances. It is my desire, therefore, that the language of the accompanying claims shall be accorded the broadest reasonable construction and shall be limited only by what is expressly stated therein and by the prior art.

I claim the following as my invention:

1. In a circuit interrupter, separable contact means, actuating means for moving said contact means to open and to close the electrical circuit through said interrupter, and a trip device operable upon the occurrence of predetermined conditions to cause said actuating means to move said contact means automatically to the open circuit position, said trip device being removable as a unit from operative engagement with the other structural elements of said interrupter, and including a sealed closure, electro-responsive tripping means actuable to effect the operation thereof and means carried by the trip device including a movable operating member insulated from the circuit for varying the tripping point of said tripping means within predetermined limits, said operating member being operable from outside said sealed closure.

2. In a circuit interrupter, a main closure, separable contact means disposed within said closure, actuating means also disposed within said closure for moving said contact means to open and to close the electrical circuit through said interrupter, and a trip device operable to cause said actuating means to move said contact means automatically to the open circuit position, said trip device being removable as a unit from operative engagement with the other structural elements of said interrupter and including a closure separate from said main closure, electro-responsive tripping means actuable upon the occurrence of predetermined conditions to effect the operation of said device disposed within said separate closure, terminals extending outside said separate closure for connection in the circuit through the breaker and adjustable means, which is actuable from without said separate closure, for varying the tripping point of said electro-responsive means within predetermined limits.

3. In a circuit interrupter, separable contact means, actuating means for moving said contact means to open and to close the electrical circuit through said interrupter and a trip device operable upon the occurrence of predetermined conditions to cause said actuating means to move said contact means automatically to the open circuit position, said trip device being removable as a unit from operative engagement with the other structural elements of said interrupter, and including a sealed closure, electro-responsive tripping means, actuable to effect the operation of said device, disposed within said closure, and means whereby the tripping point of said tripping means may be varied without necessitating the opening of said sealed closure.

4. In a circuit interrupter, separable contact means, actuating means for moving said contact means to open and to close the electrical circuit through said interrupter, and a trip device operable to cause said actuating means to move said contact means automatically from one position to the other, said trip device including a trip bar, movable from a normal inoperative to an operative position to effect the operation of said device, electro-responsive tripping means actuable upon the occurrence of predetermined conditions to move said trip bar from said inoperative to said operative position, and means which is entirely supported upon said trip bar for varying the tripping point of said electro-responsive tripping means within certain defined limits, said last mentioned means including a movable operating member and notching means for controlling the movement of said member.

5. In a circuit interrupter, separable contact means, actuating means for moving said contact means to open and to close the electrical circuit through said interrupter, and a trip device operable to cause said actuating means to move said contact means automatically from one position to the other, said trip device including a pivotally supported trip bar which is movable from a normal inoperative to an operative position to effect the operation of said device, electro-responsive tripping means actuable upon the occurrence of predetermined conditions to move said trip bar from said inoperative to said operative position, and means which is supported on said trip bar so as to be disposed intermediate said bar and said tripping means for varying the tripping point of said tripping means within certain defined limits, said last mentioned means including a rotatable operating member, screw adjusting means adapted to be operated thereby, and notching means for controlling the movement of said operating member.

6. In a circuit interrupter, separable contact means, actuating means for moving said contact means to open and to close the electrical circuit through said interrupter, a trip device operable to cause said actuating means to move said contact means automatically from one position to the other, said trip device including a sealed closure, a trip bar which is disposed within said closure and which is movable from a normal inoperative to an operative position to effect the operation of said device, electro-responsive tripping means which is also disposed within said closure and which is actuable upon the occurrence of predetermined conditions to move said trip bar from said inoperative to said operative position, and means actuable from without said sealed closure for varying the tripping point of said electro-responsive means within certain defined limits.

7. In a circuit interrupter, a main closure, separable contact means disposed within said closure, actuating means also disposed within said closure for moving said contact means to open and to close the electrical circuit through said interrupter, and a trip device operable to cause said actuating means to move said contact means automatically to the open circuit position, said trip device being removable as a unit from operative engagement with the other structural elements of said interrupter and including a closure separate from said main closure, a trip bar which is disposed within said separate closure and which is movable from a normal inoperative to an operative position to effect the operation of said device, electro-responsive tripping means which is also disposed within said closure and which is actuable upon the occurrence of predetermined conditions to move said trip bar from said inoperative to said operative position to effect the operation of said device, terminals extending outside of said separated closure for connecting the tripping means in the circuit of the breaker and adjustable means, which is actuable from without said separate closure for varying the tripping point of said electro-responsive means within predetermined limits.

8. In a circuit interrupter, separable contact means, actuating means for moving said contact means to open and to close the electrical circuit through said interrupter, a trip device operable to cause said actuating means to move said contact means automatically from one position to the other, said trip device being removable as a unit from operative engagement with the other structural elements of said interrupter and including a sealed closure, a trip bar which is disposed within said closure and which is movable from a normal inoperative to an operative position to effect the operation of said device, electro-responsive tripping means which is also disposed within said closure and which is actuable upon the occurrence of predetermined conditions to move said trip bar from said inoperative to said operative position, and adjustable means which is actuable from without said sealed closure and which is supported on said trip bar for varying the tripping point of said tripping means within predetermined limits.

9. In a circuit interrupter, separable contact means, actuating means for moving said contact means to open and to close the electrical circuit through said interrupter, a trip device operable to cause said actuating means to move said contact means automatically from one position to the other, said trip device being removable as a unit from operative engagement with the other structural elements of said interrupter and including a sealed closure, a trip bar which is pivotally supported within said closure and which is movable from a normal inoperative to an operative position to effect the operation of said device, electro-responsive tripping means which is also disposed within said closure and which is actuable upon the occurrence of predetermined conditions to move said trip bar from said inoperative to said operative position, and adjustable means which is actuable from without said sealed closure for varying the tripping point of said tripping means within predetermined limits, said adjustable means including a movable operating member and notching means for controlling the movement of said member.

10. In a circuit interrupter, a main closure, separable contact means disposed within said closure, actuating means also disposed within said closure for moving said contact means to open and to close the electrical circuit through said interrupter, and a trip device which is operable to cause said actuating means to move said contact means automatically to the open circuit position, said trip device including a closure separate from said main closure, electro-responsive tripping means which is disposed within said separate closure and which is actuable upon the occurrence of predetermined conditions to effect the operation of said trip device, and adjustable means which is actuable from without said separate closure for varying the tripping point of said tripping means within predetermined limits, said adjustable means including a movable operating member and notching means for controlling the movement of said member.

11. In a circuit interrupter, a base, a removable cover for cooperating therewith to define a closure for said interrupter, separable contact means disposed within said closure, actuating means, likewise disposed within said closure for moving said contact means to open and to close the electrical circuit through said interrupter, and a trip device operable to cause said actuating means to move said contact means automatically to the open circuit position, said trip device being normally disposed within said closure and including electro-responsive tripping means actuable upon the occurrence of predetermined conditions to effect the operation of said device and adjustable means including a movable operating member for varying the operating point of said tripping means within predetermined limits, said last-mentioned means being disposed within said closure and being so arranged that it may be reached and operated when said cover is removed from engagement with said base, and a notching means for releasably retaining said operating member in any adjusted position to which it is moved.

12. In a circuit interrupter, a base, a removable cover for cooperating therewith to define a closure for said interrupter, separable contact means disposed within said closure, actuating means, likewise disposed within said closure for moving said contact means to open and to close the electrical circuit through said interrupter, and a trip device operable to cause said actuating means to move said contact means automatically to the open circuit position, said trip device being normally disposed within said closure, and including a trip bar movable from a normal inoperative to an operative position to effect the operation of said device, electro-responsive means actuable upon the occurrence of predetermined conditions to move said trip bar from said inoperative to said operative position, and adjustable means including a movable operating member and notching means for controlling the movement of said member, for varying the operating point of said electro-responsive means within predetermined limits, said adjustable means being disposed within said closure, and being so arranged that said operating member may be reached and moved when said cover is removed from engagement with said base.

13. In a circuit interrupter, a base, a removable cover for cooperating therewith to define a closure for said interrupter, separable contact means disposed within said closure, actuating means, likewise disposed within said closure for moving said contact means to open and to close the electrical circuit through said interrupter, and a trip device which is normally disposed within said closure and which is operable to cause said actuating means to move said contact means automatically to the open circuit position, said trip device being removable as a unit from operative engagement with the other structural elements of said interrupter and including electro-responsive tripping means actuable upon the occurrence of predetermined conditions to effect the operation of said device and adjustable means for varying the operating point of said tripping means within predetermined limits, said adjustable means including a movable operating member which is so arranged that it may be reached and moved when said cover is removed from engagement with said base, and a notching means for releasably restraining said operating member in any adjusted position to which it is moved.

14. In a circuit interrupter, a main base, a removable cover for cooperating therewith to define a closure for said interrupter, separable contact means disposed within said closure, actuating means, likewise disposed within said closure for moving said contact means to open and to close the electrical circuit through said interrupter, and a trip device which is normally disposed within said closure and which is operable to cause said actuating means to move said contact means automatically to the open circuit position, said trip device being removable as a unit from operative engagement with the other structural elements of said interrupter and including, a base, a trip bar supported on said base and movable from a normal inoperative to an operative position by a current responsive tripping means to effect the operation of said trip device, and adjustable means for varying the operating point of said tripping means within predetermined limits, said adjustable means including a movable operating member which is so arranged that it may be reached and moved when said cover is removed from engagement with said main base, and notching means for controlling the movement of said operating member.

15. In a multi-pole circuit interrupter, a plurality of pairs of separable contact means for defining a plurality of poles, actuating means for moving said contact means to open and to close the electrical circuit through the several poles of said interrupter, and a trip device operable to cause said actuating means to move said contact means automatically to the open circuit position, said trip device including a trip bar which extends across a plurality of the poles of said interrupter and which is movable from a normal inoperative to an operative position to effect the operation of said device, a plurality of electro-responsive tripping means each of which is individually operable upon the occurrence of predetermined conditions to move said trip bar from said inoperative to said operative position, and a plurality of separate adjusting means each of which includes a movable operating member and a suitable calibration scale for varying the operating point of each of a plurality of said electroresponsive tripping means within predetermined limits.

16. In a multi-pole circuit interrupter, a plurality of pairs of separable contacts means for defining a plurality of poles, actuating means for moving said contact means to open and to close the electrical circuit through the several poles of said interrupter, and a trip device operable to cause said actuating means to move said contact means automatically to the open circuit position, said trip device being removable as a unit from operative engagement with the other structural elements of said interrupter and including a base, a trip bar which is supported thereon, which extends across a plurality of the poles of said interrupter, and which is movable from a normal inoperative to an operative position to effect the operation of said device, a plurality of electro-responsive tripping means each of which is individually operable upon the occurrence of predetermined conditions to move said trip bar from said inoperative to said operative position, and a plurality of separate adjusting means each of which includes a movable operating member and a suitable calibration scale, both entirely supported on said trip bar, for varying the operating point of each of a plurality of said electro-responsive tripping means within predetermined limits.

17. In an electro-responsive trip device, a base member, a trip bar supported thereon, said trip bar being movable from a normal inoperative to an operative position to effect the operation of said device, electro-responsive tripping means actuable upon the occurrence of predetermined conditions to move said trip bar from said inoperative to said operative position, and means which is entirely supported upon said trip bar for varying the operating point of said electro-responsive tripping means within predetermined limits, said last-mentioned means including a supporting frame, a calibration scale, and a rotatable operating member which includes an indicator for cooperating with said calibration scale.

18. In an electro-responsive trip device, a base, a trip member supported thereon, said trip member being movable from a normal position to a tripping position to effect operation of said device, electro-responsive tripping means operable in response to predetermined conditions to effect movement of said trip member to tripping position, a closure for said device, means including a movable operating member which is operable from outside said closure for varying the trip characteristic of said tripping means, and notching means for releasably retaining said operating member in any adjusted position to which it is moved.

19. In an electro-responsive trip device, a base, a trip member supported thereon, said trip member being movable from a normal position to a tripping position to effect operation of said device, electro-responsive tripping means operable in response to predetermined conditions to effect movement of said trip member to tripping position, means for adjusting the tripping point of said tripping means including a movable operating member, and notching means for releasably holding said operating member in adjusted position.

20. In an electro-responsive trip device for a circuit breaker, a casing, tripping mechanism operable in response to predetermined conditions for operating said trip device mounted within said casing, means including a movable operating member operable from outside said casing for varying the trip characteristic of said device, and notching means for releasably retaining said operating member in any adjusted position to which it is moved.

21. In a circuit breaker, relatively movable contacts, actuating means therefor, a trip device operable to cause said actuating means to move said contacts to open circuit position, said trip device including electro-responsive tripping means operable in response to predetermined conditions to effect operation of said trip device, adjusting means including a movable operating member for varying the tripping characteristic of said tripping means within predetermined limits, and notching means for releasably retaining said operating member in any adjusted position to which it is moved.

22. In a circuit breaker, relatively movable contacts, actuating means therefor, a trip device operable to cause said actuating means to move said contacts to open circuit position, said trip device including electroresponsive tripping means operable in response to predetermined conditions to effect operation of said trip device, adjusting means for the trip device including a movable member adjustable within predetermined limits for varying the tripping characteristic of said tripping means, and means movable during the assembly and calibration of the trip device for adjusting said limits.

23. In a circuit breaker, relatively movable contacts, actuating means therefor, a trip device operable to cause said actuating means to move said contacts to open circuit position, said trip device including electroresponsive means to effect operation of said trip device, adjusting means for varying the trip characteristic of said trip device, said adjusting means being initially movable and then permanently set to permit operation of said trip device in response to one predetermined condition, and including a movable operating member movable at will after the device has been set to vary the trip characteristic of the trip device a limited amount only relative to the permanent setting.

24. A trip device for a circuit breaker comprising tripping mechanism operable in response to predetermined conditions to trip the breaker, adjusting means including a movable operating member adjustable within predetermined limits for varying the trip characteristic of said tripping mechanism, and means for initially adjusting the limits of adjustment.

25. A trip device for a circuit breaker comprising tripping mechanism operable in response to predetermined conditions to trip the breaker, adjusting means for varying the trip characteristic of said tripping means within predetermined limits, said adjusting means being initially locked set to cause operation of said tripping mechanism in response to predetermined conditions and including a movable operating member movable to vary the trip characteristic a limited amount relative to the locked setting.

JEROME SANDIN.